United States Patent
Jin et al.

(10) Patent No.: US 11,210,203 B2
(45) Date of Patent: Dec. 28, 2021

(54) TESTING PLATFORM FOR BLOCKCHAIN NETWORKS

(71) Applicant: Advanced New Technologies, Co., Ltd., George Town (KY)

(72) Inventors: Ge Jin, Hanzghou (CN); Kailai Shao, Hanzghou (CN); Pengtao Qi, Hanzghou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/390,085

(22) Filed: Apr. 22, 2019

(65) Prior Publication Data
US 2019/0251018 A1    Aug. 15, 2019

Related U.S. Application Data

(63) Continuation of application No. PCT/CN2018/118532, filed on Nov. 30, 2018.

(51) Int. Cl.
*G06F 11/36* (2006.01)
*H04L 9/32* (2006.01)
*H04L 9/06* (2006.01)

(52) U.S. Cl.
CPC ...... *G06F 11/3664* (2013.01); *G06F 11/3692* (2013.01); *G06F 11/3696* (2013.01); *H04L 9/0637* (2013.01); *H04L 9/3236* (2013.01); *H04L 2209/38* (2013.01)

(58) Field of Classification Search
None
See application file for complete search history.

(56) References Cited

U.S. PATENT DOCUMENTS

| 2015/0293952 A1* | 10/2015 | Ogrinz | G06F 16/27 707/702 |
| 2017/0235795 A1* | 8/2017 | Gilder | G06F 16/9024 707/754 |
| 2018/0137512 A1* | 5/2018 | Georgiadis | H04L 9/3239 |
| 2018/0157583 A1 | 6/2018 | Bache et al. | |

(Continued)

FOREIGN PATENT DOCUMENTS

| CN | 108011741 | 5/2018 |
| CN | 108073513 | 5/2018 |

(Continued)

OTHER PUBLICATIONS

Carlos Sérgio Figueira Faria, "BlockSim: Blockchain Simulator", Nov. 15, 2018, Tecnico Lisboa (Year: 2018).*
Miller, "Shadow-Bitcoin: Scalable Simulation via Direct Execution of Multi-threaded Applications", UMD (Year: 2015).*

(Continued)

*Primary Examiner* — Wynuel S Aquino
(74) *Attorney, Agent, or Firm* — Fish & Richardson P.C.

(57) ABSTRACT

Implementations of the present disclosure include instantiating a test blockchain container having read-only access to a production blockchain, copying a set of blocks from the production blockchain to a test environment to provide a test blockchain, the test blockchain container having read-write access to the test blockchain, and executing a test of a blockchain application, the test resulting in a set of test blocks being sequentially appended to the test blockchain, each test block at least partially including test data, wherein production blocks are appended to the production blockchain during execution of the test.

18 Claims, 4 Drawing Sheets

(56) References Cited

U.S. PATENT DOCUMENTS

| | | | |
|---|---|---|---|
| 2018/0181979 A1 | 6/2018 | Frank et al. | |
| 2018/0260212 A1* | 9/2018 | Wisnovsky | G06F 8/71 |
| 2018/0343175 A1 | 11/2018 | Bathen et al. | |
| 2019/0130114 A1* | 5/2019 | Smith | G06F 21/577 |
| 2019/0171739 A1* | 6/2019 | Cochrane | G06F 16/215 |
| 2019/0306173 A1* | 10/2019 | Reddy | H04L 63/126 |
| 2019/0379543 A1* | 12/2019 | Sethi | H04L 9/3236 |
| 2020/0162263 A1* | 5/2020 | Iyer | H04L 9/3236 |
| 2020/0356991 A1* | 11/2020 | Saraniecki | G06Q 20/10 |

FOREIGN PATENT DOCUMENTS

| | | |
|---|---|---|
| CN | 108170590 | 6/2018 |
| CN | 108628745 | 10/2018 |
| CN | 108712276 | 10/2018 |
| CN | 108833398 | 11/2018 |
| JP | 2018185808 | 11/2018 |
| WO | 2018149504 | 8/2018 |

OTHER PUBLICATIONS

StackExchange , "Running testnet and main net on the same geth" (Year: 2017).*
Extended European Search Report in European Application No. 18866302.5, dated Nov. 8, 2019, 7 pages.
Liao et al., "Toward A Service Platform for Developing Smart Contracts on Blockchain in BDD and TDD Styles," 2017 EEE 10th Conference on Service-Oriented Computing and Applications (SOCA), Nov. 2017, pp. 133-140.
International Search Report and Written Opinion in International Application No. PCT/CN2018/118532, dated Aug. 19, 2019, 6 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
International Preliminary Report on Patentability in International Application No. PCT/CN2018/118532, dated May 55, 2021,4 pages.

\* cited by examiner

TESTING PLATFORM FOR BLOCKCHAIN NETWORKS

CROSS-REFERENCE TO RELATED APPLICATIONS

This application is a continuation of PCT Application No. PCT/CN2018/118532, filed on Nov. 30, 2018, which is hereby incorporated by reference in its entirety.

BACKGROUND

Distributed ledger systems (DLSs), which can also be referred to as consensus networks, and/or blockchain networks, enable participating entities to securely and immutably store data. DLSs are commonly referred to as blockchain networks without referencing any particular user case (e.g., crypto-currencies). Example types of blockchain networks can include public blockchain networks, private blockchain networks, and consortium blockchain networks. A public blockchain network is open for all entities to use the DLS, and participate in the consensus process. A private blockchain network is provided for a particular entity, which centrally controls read and write permissions. A consortium blockchain network is provided for a select group of entities, which control the consensus process, and includes an access control layer.

Applications (which can include smart contracts) can be created, which execute in blockchain networks. Integrated development environments (IDEs) enable development of applications. An example IDE includes the Remix IDE, provided by the Ethereum Foundation of Zug, Switzerland, for creating smart contracts in Solidity. In some cases, IDEs enable testing of smart contracts for debugging, for example. However, during testing, operations are executed on a production blockchain. This results in an unstable testing environment, and a polluted production environment.

SUMMARY

Implementations of the present disclosure include computer-implemented methods for testing blockchain applications. More particularly, implementations of the present disclosure are directed to a testing platform for blockchain networks that enables testing of applications without impacting a production blockchain.

In some implementations, actions include instantiating a test blockchain container having read-only access to a production blockchain, copying a set of blocks from the production blockchain to a test environment to provide a test blockchain, the test blockchain container having read-write access to the test blockchain, and executing a test of a blockchain application, the test resulting in a set of test blocks being sequentially appended to the test blockchain, each test block at least partially including test data, wherein production blocks are appended to the production blockchain during execution of the test. Other implementations include corresponding systems, apparatus, and computer programs, configured to perform the actions of the methods, encoded on computer storage devices.

These and other implementations may each optionally include one or more of the following features: a production blockchain container is provided, and has read-write access to the production blockchain, and is without access to the test blockchain; the production blockchain container is provided in parallel with the test blockchain container within a server system participating in a blockchain network; during the test, a plurality of nodes execute a consensus protocol for appending test blocks to the test blockchain, each node of the plurality of nodes maintaining a copy of the test blockchain; actions further include: deleting test blocks appended to the test blockchain during the test, and executing a second test resulting in a second set of test blocks being sequentially appended to the test blockchain; and actions further include, in response to ending of the test, terminating test blockchain containers for each node of a plurality of nodes participating in the test.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
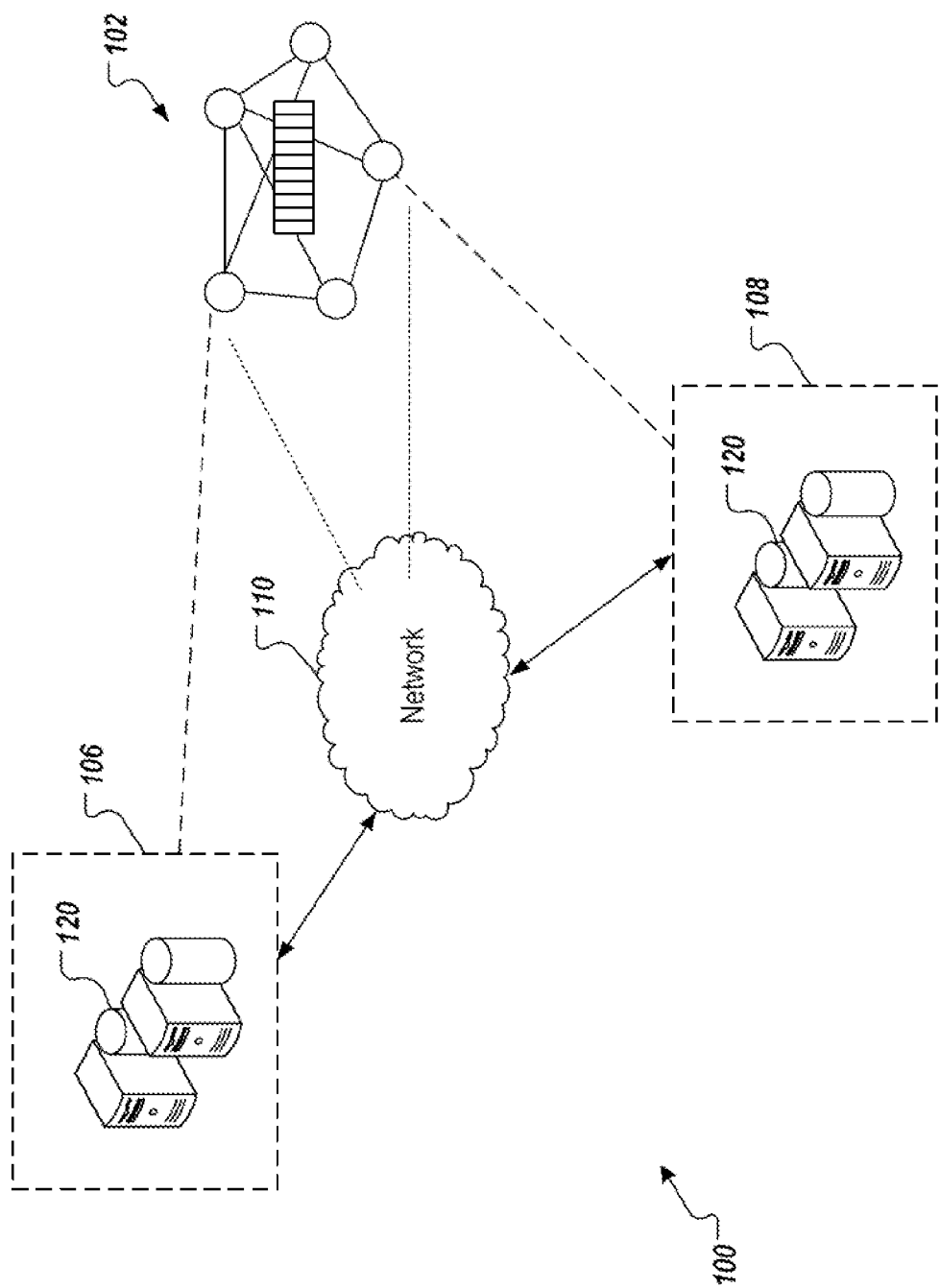
FIG. 1 depicts an example environment that can be used to execute implementations of the present disclosure.

Implementations of the present disclosure include computer-implemented methods for testing blockchain applications. More particularly, implementations of the present disclosure are directed to a testing platform for blockchain networks that enables testing of applications without impacting a production blockchain. In some implementations, actions include instantiating a test blockchain container having read-only access to a production blockchain, copying a set of blocks from the production blockchain to a test environment to provide a test blockchain, the test blockchain container having read-write access to the test blockchain, and executing a test of a blockchain application, the test resulting in a set of test blocks being sequentially appended to the test blockchain, each test block at least partially including test data, wherein production blocks are appended to the production blockchain during execution of the test.

To provide further context for implementations of the present disclosure, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associate with the Bitcoin crypto-currency network, blockchain is used herein to generally refer to a DLS without reference to any particular use case. As introduced above, a blockchain network can be provided as a public blockchain network, a private blockchain network, or a consortium blockchain network.

In a public blockchain network, the consensus process is controlled by nodes of the consensus network. For example, hundreds, thousands, even millions of entities can cooperate a public blockchain network, each of which operates at least one node in the public blockchain network. Accordingly, the public blockchain network can be considered a public network with respect to the participating entities. In some examples, a majority of entities (nodes) must sign every block in order for the block to be valid, and added to the blockchain (distributed ledger) of the blockchain network. An example public blockchain network includes the Bitcoin network, which is a peer-to-peer payment network. The Bitcoin network leverages a distributed ledger, referred to as blockchain. As noted above, the term blockchain, however, is used to generally refer to distributed ledgers without particular reference to the Bitcoin network.

In general, a public blockchain network supports public transactions. A public transaction is shared with all of the nodes within the public blockchain network, and are stored in a global blockchain. A global blockchain is a blockchain that is replicated across all nodes. That is, all nodes are in perfect state consensus with respect to the global blockchain. To achieve consensus (e.g., agreement to the addition of a block to a blockchain), a consensus protocol is implemented within the public blockchain network. An example consensus protocol includes, without limitation, proof-of-work (POW) implemented in the Bitcoin network.

In general, a private blockchain network private blockchain network is provided for a particular entity, which centrally controls read and write permissions. The entity controls, which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network is private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

Implementations of the present disclosure are described in further detail herein with reference to a consortium blockchain network, which is public among the participating entities. It is contemplated, however, that implementations of the present disclosure can be realized in any appropriate type of blockchain network.

Implementations of the present disclosure are described in further detail herein in view of the above context. More particularly, and as introduced above, implementations of the present disclosure are directed to a testing platform for blockchain networks that enables testing of applications without impacting a production blockchain.

FIG. 1 depicts an example environment 100 that can be used to execute implementations of the present disclosure. In some examples, the example environment 100 enables entities to participate in a consortium blockchain network 102, for example. The example environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link.

In the depicted example, the computing systems 106, 108 can each include any appropriate computing system that enables participation as a node in the consortium blockchain network 102. Example computing devices include, without limitation, a server, a desktop computer, a laptop computer, a tablet computing device, and a smartphone. In some examples, the computing systems 106, 108 hosts one or more computer-implemented services for interacting with the consortium blockchain network 102. For example, the computing system 106 can host computer-implemented services of a first entity (e.g., user A), such as transaction management system that the first entity uses to manage its transactions with one or more other entities (e.g., other users). The computing system 108 can host computer-implemented services of a second entity (e.g., user B), such as transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

In blockchain networks, such as consortium blockchain networks, applications can be developed, tested, and deployed for execution within the blockchain network. An example application can include, without limitation, a smart contract. A smart contract can be described as digital representations of real-world, legal contracts having contractual terms affecting various parties. A smart contract is implemented, stored, updated (as needed), and executed within, in the example context, a consortium blockchain network. Contract parties associated with the smart contract (e.g., buyers and sellers) are represented as nodes in the consortium blockchain network.

In some examples, a smart contract can store data, which can be used to record information, facts, associations, balances and any other information needed to implement logic for contract execution. Smart contracts can be described as a computer-executable program consisting of functions, where an instance of the smart contract can be created, and functions invoked for execution of the logic therein.

In technical terms, smart contracts can be implemented based on objects and object-oriented classes. For example, terms and components of the smart contract can be represented as objects that are handled by applications implementing the smart contracts. A smart contract (or an object in the smart contract) can call another smart contract (or an object in the same smart contract) just like other object-oriented objects. Calls that are made by an object can be, for example, a call to create, update, delete, propagate, or communicate with objects of another class. Calls between objects can be implemented as functions, methods, application programming interfaces (APIs), or other calling mechanisms. For example, a first object can call a function to create a second object.

An integrated development environment (IDE) can be used to develop, test, and deploy applications, such as smart contracts to blockchain networks. An example IDE includes the Remix IDE, provided by the Ethereum Foundation of Zug, Switzerland, for creating smart contracts in Solidity. In some cases, IDEs enable testing of smart contracts for debugging, for example. However, during testing, operations are executed on a production blockchain. This results in an unstable testing environment, and a polluted production environment. Using the Remix IDE as a non-limiting example, the Remix IDE provides JavaScript emulation to modify and execute smart contracts, and Web3 provider connectivity to a production blockchain. In some examples, a production blockchain refers to a live blockchain within the blockchain network that is used to record transactions between entities participating in the blockchain network. Consequently, when transaction operations are executed during testing within the Remix IDE, the operations are executed on the production blockchain. Among other problems, this results in test transactions polluting the production blockchain. Further a blockchain testing environment that simulates a production block chain can be difficult to create and maintain. For example, removing or regenerating production data may require the entire testing environment to be recreated for each test run.

In view of this, implementations of the present disclosure provide a testing platform for blockchain networks that enables testing of applications without impacting a production blockchain. In some implementations, and as described in further detail herein, the testing platform of the present disclosure uses containers to limit read/write access, and provides a test blockchain that includes at least a portion of a production blockchain. The test platform of the present disclosure avoids writing of test data to the production blockchain, and enables efficient resetting of the test platform between test runs.

Figure 2:
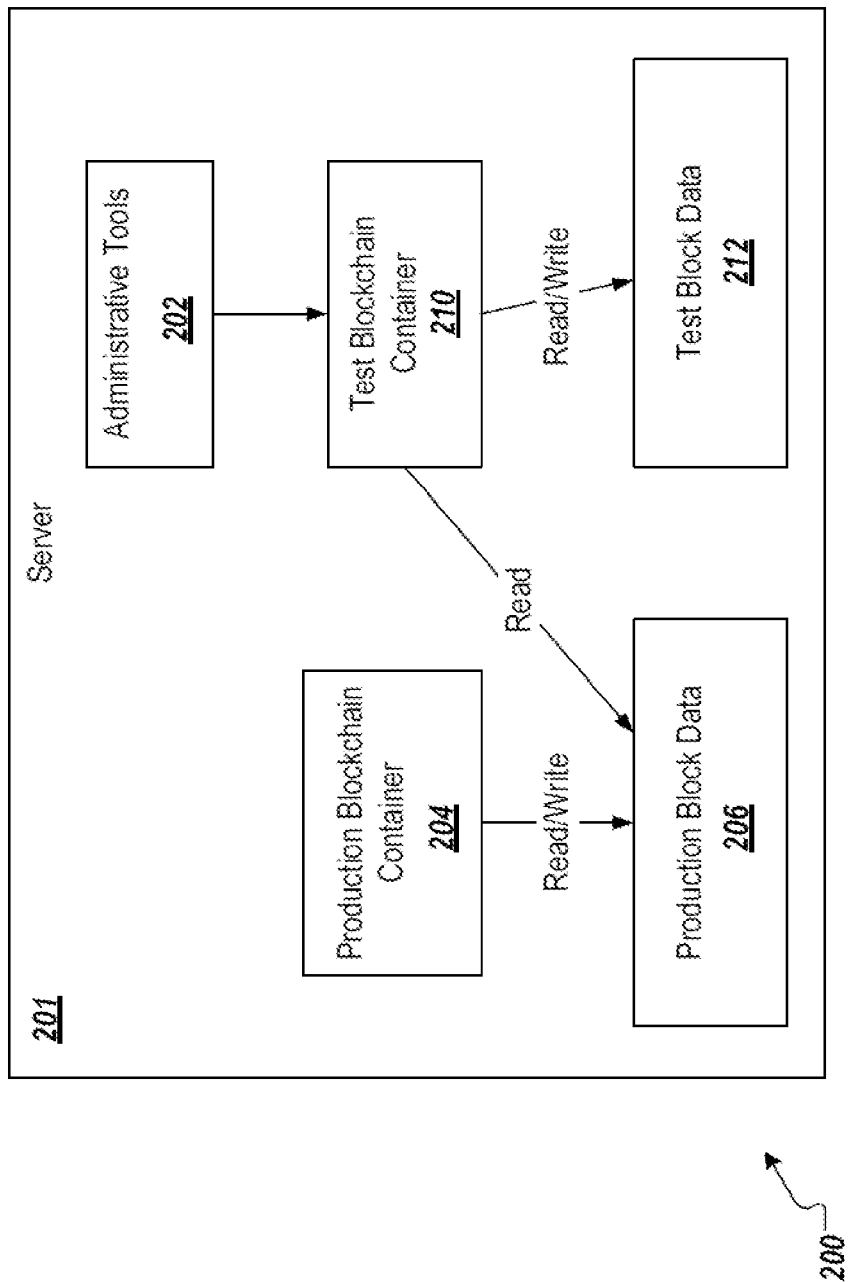
FIG. 2 depicts an example testing platform in accordance with implementations of the present disclosure.

FIG. 2 depicts an example testing platform 200 in accordance with implementations of the present disclosure. In the depicted example, the testing platform 200 includes a server system 201 that hosts administrative tools 202, a production blockchain container 204, production block data 206, a test blockchain container 210, and test block data 212. Although a single server system 201 is depicted, it is contemplated that the server system 201 can represent one or more server resources. In some examples, the administrative tools 202 are provided as one or more computer-executable programs, and enable set-up, use, and tear-down of a test environment in accordance with implementations of the present disclosure.

In some implementations, the production blockchain container 204, and the test blockchain container 210 are each provided as a container, which can be described as a unit of software that packages code and code dependencies. In further detail, a container provides a logical packaging, in which applications can be de-coupled from the environment in which they actually execute, which enables container-based applications to be deployed easily and consistently, regardless of a type of the target environment (e.g., the server system 201). An example container includes, without limitation, a docker container provided by Docker, Inc. of San Francisco, Calif. USA. Implementations of the present disclosure are described in further detail herein with reference to docker containers. It is contemplated, however, that implementations of the present disclosure can be realized using any appropriate container.

In some implementations, the production blockchain container 204 executes applications for the server system 201 to interact with the blockchain network. For example, the server system 201 can operate as a node in the blockchain network, and the production blockchain container 204 executes functionality of participation in the blockchain network (e.g., publish transactions to the blockchain network, participate in consensus processing of transactions, maintain a local copy of the blockchain). In some examples, the production block data 206 stores a local copy of the production blockchain. As the production blockchain is updated (e.g., new blocks are added to the production blockchain) as a result of transactions across the blockchain network, the production blockchain container 204 writes the updates to the production block data 206. In this manner, the production block data 206 is consistent with copies of the production blockchain stored across the nodes of the blockchain network. As depicted in FIG. 2, the production blockchain container 204 has read and write access to the production block data 206.

In accordance with implementations of the present disclosure, the test blockchain container 210 is provided, and represents the blockchain environment used for testing. The production blockchain container 210 is only provided with read access to the production block data 206. In this manner, the test blockchain container 210 is unable to write to the production block data 206, and pollution of the production blockchain through test execution is avoided. To execute testing of an application (e.g., a smart contract), the test blockchain container 210 copies block data from the production block data 206. The test blockchain container 210 executes test operations, which results in the generation of test blocks. The test blockchain container 210 writes the test blocks to the test blockchain stored in the test block data 212.

Figure 3:
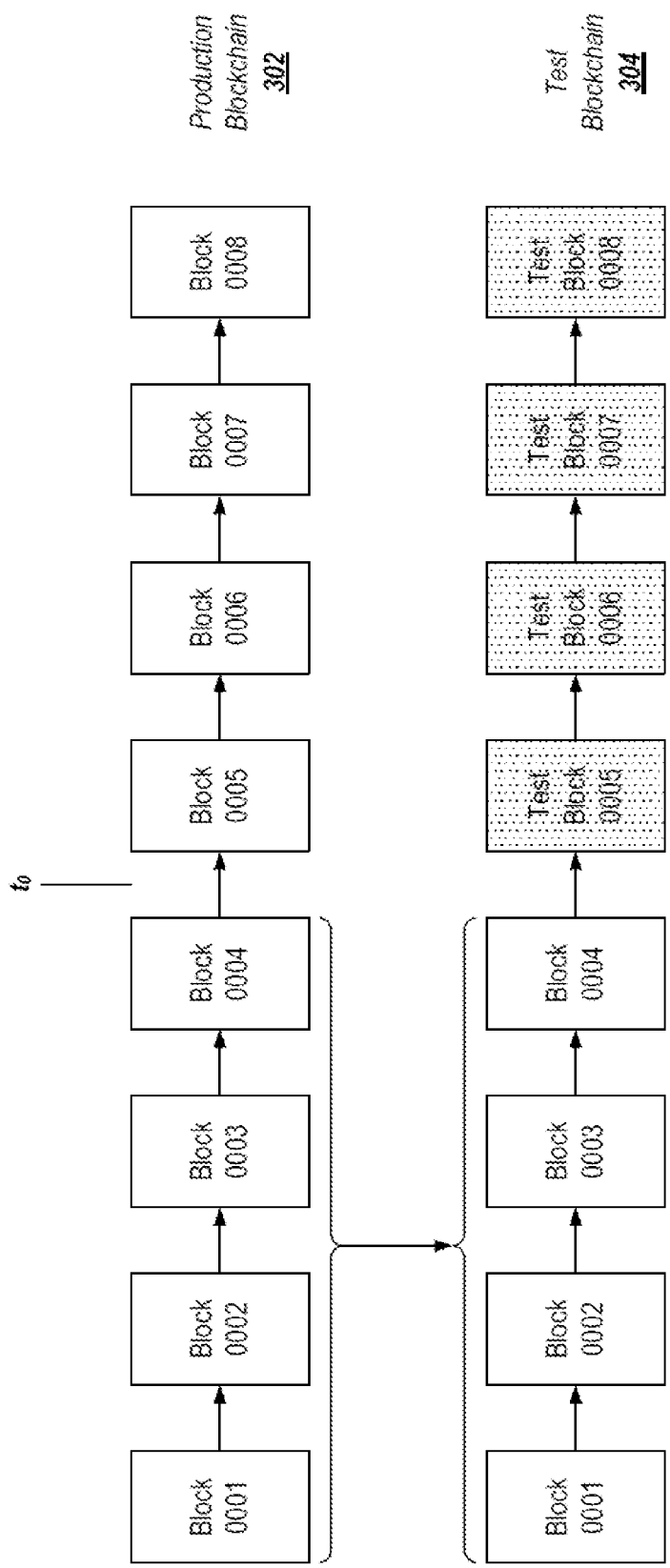
FIG. 3 schematically depicts an example production blockchain, and an example a test blockchain in accordance with implementations of the present disclosure.

FIG. 3 schematically depicts an example production blockchain 302, and an example a test blockchain 304 in accordance with implementations of the present disclosure. In some implementations, the test blockchain container 210 creates the test blockchain 304 from the production blockchain 302, and the production blockchain, and the test blockchain 304 are used by the node (e.g., the server system 201) in parallel. The test blockchain 304 is created by copying one or more blocks of the production blockchain 302. In the example of FIG. 3, the test blockchain 304 is created by copying blocks [0001]-[0004] of the production blockchain 302. That is, the test blockchain container 210 copies the block data of the blocks [0001]-[0004] from the production block data 206, and writes the block data to the test block data 212.

In some implementations, the test blockchain 304 is created as a copy of the entire production blockchain 302. For example, the test blockchain 304 can be created at a time $t_0$. In some examples, at time $t_0$, the production blockchain 302 only includes the blocks [0001]-[0004]. Consequently, the test blockchain 304 is created as a complete copy of the production blockchain 302 at time $t_0$.

After the time $t_0$, testing of an application is performed, and blocks generated as part of the testing are added to the test blockchain 304. For example, a JavaScript virtual machine (VM) provided by the Remix IDE simulates a runtime environment. Consequently, the IDE cannot guarantee simulation of the blockchain link operations, such as consensus and block. For example, in production operation, the consensus protocol is relied upon by the blockchain network to reach agreement among the nodes participating in the blockchain network, as to which blocks are to be added to the blockchain.

In some examples, consensus data may not be stored in the production blockchain, so if the node (e.g., the server system 201) determines the links of the production blockchain operation cannot be simulated, the test blockchain operating environment re-enacts the production blockchain operation. This results in producing identical testing blocks of the production data (Block 0005-0008) in the test environment. Thus, the production blockchain 302, and the test blockchain 304 can be executed in parallel, and independent of one another. Specifically, and in accordance with implementations of the present disclosure, the test blockchain 304 can be modified without affecting the production blockchain 302, and vice-versa. As described herein, for example, with reference to FIG. 2, the test blockchain container 210 reads from the production block data 206, such that the test blockchain container 210 has access to all of the production block data 206 during test execution. In this manner, the test blockchain 304 reflects the production data, as blocks are added to the test blockchain 304 during testing (e.g., after time $t_0$). The production chain (302) does not have access to the test data folder.

In some implementations, testing can be completed, and test results reviewed. It can be determined that a subsequent round of testing is to be performed. In some examples, the set of test blocks that had been added to the test blockchain 304 is deleted (e.g., blocks [0005]-[0008]). The subsequent round of testing is executed and new test blocks are sequentially appended to the test blockchain 304. In some implementations, if it is determined that no further test round are to be performed, the test environment containing the testing blockchain can be reset. The management tools identify the test case to terminate and generate a list of one or more nodes executing the test chain. The test blockchain container 210 is terminated for the list containing one or more of the identified nodes.

Figure 4:
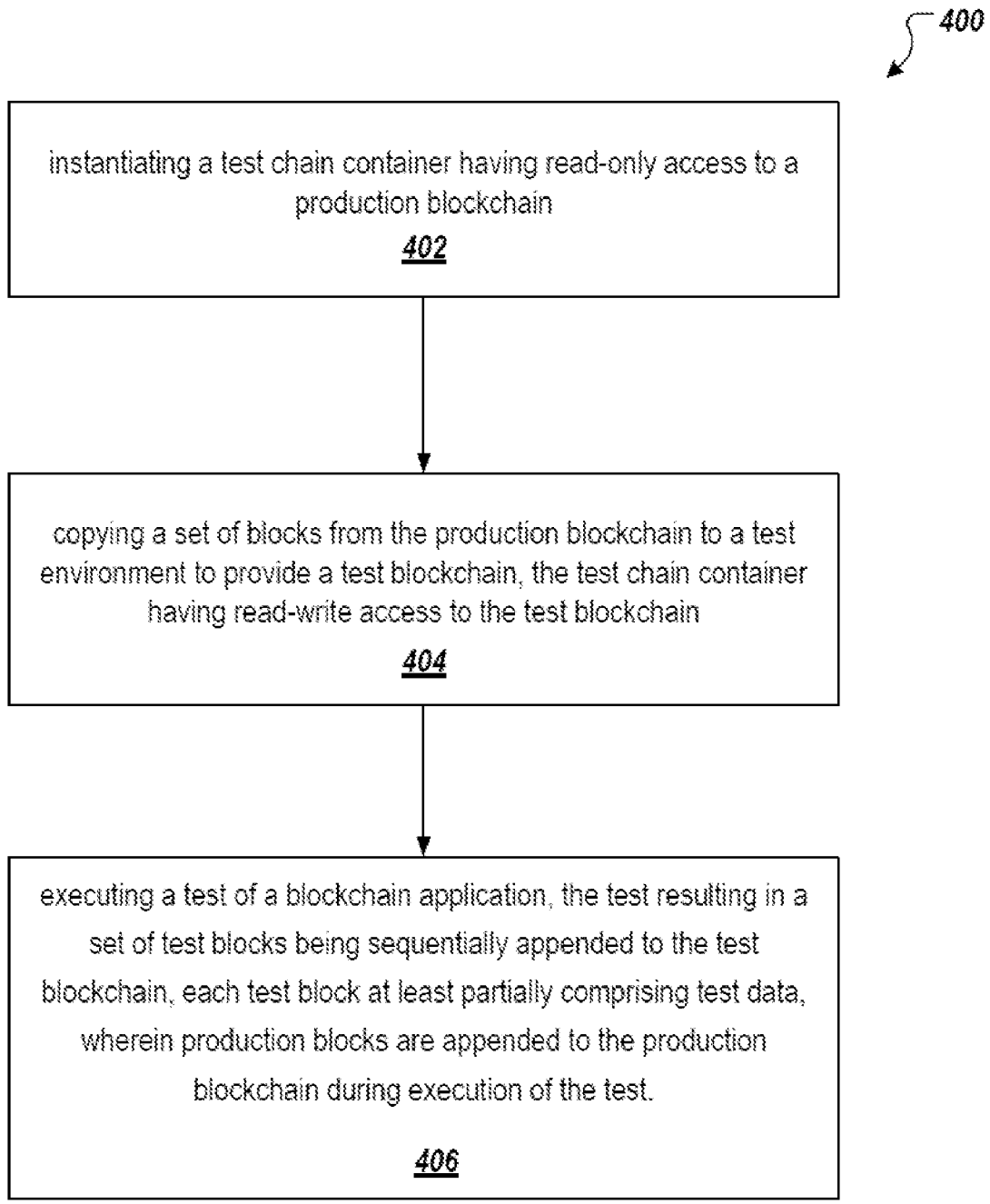
FIG. 4 depicts an example process that can be executed in accordance with implementations of the present disclosure.

FIG. 4 depicts an example process 400 that can be executed in accordance with implementations of the present disclosure. In some implementations, the example process 400 may be performed using one or more computer-executable programs executed using one or more computing devices. The example process 400 is based on one or more the above-described figures. In general, the example process is directed to create and maintain a blockchain application in accordance with implementations of the present disclosure.

As described herein, for example, with reference to FIG. 2, instantiating a test chain container having read-only access to a production blockchain (Step 402).

Copying a set of blocks from the production blockchain to a test environment to provide a test blockchain, the test chain container having read-write access to the test blockchain (Step 404) as further specified by FIGS. 3 and 2 respectively.

As described herein, for example, with reference to FIG. 3, executing a test of a blockchain application, the test resulting in a set of test blocks being sequentially appended to the test blockchain, each test block at least partially including test data, wherein production blocks are appended to the production blockchain during execution of the test (Step 406).

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for testing blockchain applications, the method being executed by one or more processors, and comprising:
   instantiating, on a computing system, a test blockchain container having read-only access to a production blockchain of a blockchain network;
   instantiating, on the computing system, a production blockchain container having read-write access to the production blockchain, wherein the test blockchain container and the production blockchain container each comprise a software application that packages code and code dependencies in a logical packaging;
   copying, by the test blockchain container, a set of blocks from the production blockchain to a test environment, thereby providing a test blockchain that includes the set of blocks from the production blockchain, the test blockchain container having read-write access to the test blockchain; and
   executing a test of a blockchain application on the test blockchain in the test environment independent of a production environment of the blockchain network, wherein executing the test comprises generating, based at least on the set of blocks from the production blockchain that are in the test blockchain, a set of test blocks that each comprise test data and sequentially appending the test blocks to the test blockchain independent of the production blockchain and without appending the test blocks to the production blockchain, wherein during execution of the test of the blockchain application,
      production blocks are independently appended to the production blockchain in parallel with the test blocks being appended to the test blockchain,
      the test blockchain is modified without affecting the production blockchain and the production blockchain is modified without affecting the test blockchain, and
      the production blockchain container interacts with the production blockchain in parallel with the test blockchain container executing operations of the test of the blockchain application.

2. The computer-implemented method of claim 1, wherein the production blockchain container is blocked from accessing the test blockchain.

3. The computer-implemented method of claim 1, wherein, during the test, a plurality of nodes execute a consensus protocol for appending the test blocks to the test blockchain, each node of the plurality of nodes maintaining a copy of the test blockchain.

4. The computer-implemented method of claim 1, further comprising:
   deleting the test blocks appended to the test blockchain during the test; and
   executing a second test resulting in a second set of test blocks being sequentially appended to the test blockchain.

5. The computer-implemented method of claim 1, further comprising, in response to ending of the test, terminating test blockchain containers for each node of a plurality of nodes participating in the test.

6. The computer-implemented method of claim 1, wherein:
   the computing system serves as a node on the blockchain network;
   the production blockchain container executes applications to interact with the production blockchain; and
   the read-only access to the production blockchain prevents the test blockchain container from writing to the production blockchain.

7. A non-transitory computer-readable storage medium coupled to one or more processors and having instructions stored thereon which, when executed by the one or more processors, cause the one or more processors to perform operations for testing blockchain applications, the operations comprising:
   instantiating, on a computing system, a test blockchain container having read-only access to a production blockchain of a blockchain network;
   instantiating, on the computing system, a production blockchain container having read-write access to the production blockchain, wherein the test blockchain container and the production blockchain container each comprise a software application that packages code and code dependencies in a logical packaging;
   copying, by the test blockchain container, a set of blocks from the production blockchain to a test environment, thereby providing a test blockchain that includes the set of blocks from the production blockchain, the test blockchain container having read-write access to the test blockchain; and
   executing a test of a blockchain application on the test blockchain in the test environment independent of a production environment of the blockchain network, wherein executing the test comprises generating, based at least on the set of blocks from the production blockchain that are in the test blockchain, a set of test blocks that each comprise test data and sequentially appending the test blocks to the test blockchain independent of the production blockchain and without appending the test blocks to the production blockchain, wherein during execution of the test of the blockchain application,
      production blocks are independently appended to the production blockchain in parallel with the test blocks being appended to the test blockchain, the test blockchain is modified without affecting the production blockchain and the production blockchain is modified without affecting the test blockchain, and the production blockchain container interacts with the production blockchain in parallel with the test blockchain container executing operations of the test of the blockchain application.

8. The non-transitory computer-readable storage medium of claim 7, wherein the production blockchain container is blocked from accessing the test blockchain.

9. The non-transitory computer-readable storage medium of claim 7, wherein, during the test, a plurality of nodes execute a consensus protocol for appending the test blocks to the test blockchain, each node of the plurality of nodes maintaining a copy of the test blockchain.

10. The non-transitory computer-readable storage medium of claim 7, wherein operations further comprise:

deleting the test blocks appended to the test blockchain during the test; and executing a second test resulting in a second set of test blocks being sequentially appended to the test blockchain.

11. The non-transitory computer-readable storage medium of claim 7, wherein operations further comprise, in response to ending of the test, terminating test blockchain containers for each node of a plurality of nodes participating in the test.

12. The non-transitory computer-readable storage medium of claim 7, wherein:

the computing system serves as a node on the blockchain network;

the production blockchain container executes applications to interact with the production blockchain; and the read-only access to the production blockchain prevents the test blockchain container from writing to the production blockchain.

13. A system, comprising:

a computing device comprising a computer processor; and a computer-readable storage device coupled to the computing device and having instructions stored thereon which, when executed by the computing device, cause the computing device to perform operations for testing blockchain applications, the operations comprising:

instantiating, on the computing device, a test blockchain container having read-only access to a production blockchain of a blockchain network;

instantiating, on the computing device, a production blockchain container having read-write access to the production blockchain, wherein the test blockchain container and the production blockchain container each comprise a software application that packages code and code dependencies in a logical packaging;

copying, by the test blockchain container, a set of blocks from the production blockchain to a test environment, thereby providing a test blockchain that includes the set of blocks from the production blockchain, the test blockchain container having read-write access to the test blockchain; and executing a test of a blockchain application on the test blockchain in the test environment independent of a production environment of the blockchain network, wherein executing the test comprises generating, based at least on the set of blocks from the production blockchain that are in the test blockchain, a set of test blocks that each comprise test data and sequentially appending the test blocks to the test blockchain independent of the production blockchain and without appending the test blocks to the production blockchain, wherein during execution of the test of the blockchain application, production blocks are independently appended to the production blockchain in parallel with the test blocks being appended to the test blockchain, the test blockchain is modified without affecting the production blockchain and the production blockchain is modified without affecting the test blockchain, and the production blockchain container interacts with the production blockchain in parallel with the test blockchain container executing operations of the test of the blockchain application.

14. The system of claim 13, wherein the production blockchain container is blocked from accessing the test blockchain.

15. The system of claim 13, wherein, during the test, a plurality of nodes execute a consensus protocol for appending the test blocks to the test blockchain, each node of the plurality of nodes maintaining a copy of the test blockchain.

16. The system of claim 13, wherein operations further comprise:

deleting the test blocks appended to the test blockchain during the test; and executing a second test resulting in a second set of test blocks being sequentially appended to the test blockchain.

17. The system of claim 13, wherein operations further comprise, in response to ending of the test, terminating test blockchain containers for each node of a plurality of nodes participating in the test.

18. The system of claim 13, wherein:

the computing device serves as a node on the blockchain network;

the production blockchain container executes applications to interact with the production blockchain; and the read-only access to the production blockchain prevents the test blockchain container from writing to the production blockchain.

\* \* \* \* \*

UNITED STATES PATENT AND TRADEMARK OFFICE
CERTIFICATE OF CORRECTION

| | | |
|---|---|---|
| PATENT NO. | : 11,210,203 B2 | |
| APPLICATION NO. | : 16/390085 | |
| DATED | : December 28, 2021 | |
| INVENTOR(S) | : Ge Jin, Kailai Shao and Pengtao Qi | |

It is certified that error appears in the above-identified patent and that said Letters Patent is hereby corrected as shown below:

On the Title Page

Column 1, Line 1 (item (71)), delete "Technologies," and insert -- Technologies --.

Column 1, Line 1 (item (72)), delete "Hanzghou (CN)" and insert -- Hangzhou (CN) --.

Signed and Sealed this
Seventh Day of June, 2022

Katherine Kelly Vidal
*Director of the United States Patent and Trademark Office*